(12) United States Patent
Cudak et al.

(10) Patent No.: US 8,449,119 B2
(45) Date of Patent: May 28, 2013

(54) MODIFYING APPLICATION WINDOWS BASED ON PROJECTION SURFACE CHARACTERISTICS

(75) Inventors: Gary D. Cudak, Research Triangle Park, NC (US); Christopher J. Hardee, Research Triangle Park, NC (US); Randall C. Humes, Research Triangle Park, NC (US); Heather C. Miller, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 12/874,083

(22) Filed: Sep. 1, 2010

(65) Prior Publication Data

US 2012/0050689 A1 Mar. 1, 2012

(51) Int. Cl.
*G03B 21/14* (2006.01)

(52) U.S. Cl.
USPC .............. 353/69; 353/30; 353/70; 353/121; 345/1.2; 345/619; 382/174; 382/206

(58) Field of Classification Search
USPC .............. 353/30, 31, 34, 37, 69, 70, 98, 99, 353/121; 348/745, 746, 747, 806, 580, 581, 348/583, 744; 345/146, 211, 213, 619, 660, 345/581, 605, 764, 781, 788, 800, 810, 815; 382/174, 206
See application file for complete search history.

(56) References Cited

U.S. PATENT DOCUMENTS

| | | | |
|---|---|---|---|
| 6,367,933 B1* | 4/2002 | Chen et al. | 353/69 |
| 6,433,840 B1* | 8/2002 | Poppleton | 348/745 |
| 6,456,339 B1* | 9/2002 | Surati et al. | 348/745 |
| 6,476,821 B2* | 11/2002 | Sawada et al. | 345/620 |
| 6,802,614 B2* | 10/2004 | Haldiman | 353/69 |
| 7,125,122 B2* | 10/2006 | Li et al. | 353/31 |
| 7,663,640 B2 | 2/2010 | Nayar et al. | |
| 7,973,795 B2* | 7/2011 | Miyazawa | 345/581 |
| 2002/0015052 A1* | 2/2002 | Deering | 345/647 |
| 2004/0012849 A1 | 1/2004 | Cruz-Uribe et al. | |
| 2007/0091107 A1* | 4/2007 | Miyazawa | 345/581 |
| 2007/0091118 A1 | 4/2007 | Allen et al. | |
| 2007/0146556 A1* | 6/2007 | Fujimori | 348/744 |
| 2007/0176851 A1 | 8/2007 | Willey et al. | |
| 2007/0274588 A1 | 11/2007 | Jeong et al. | |
| 2008/0013057 A1 | 1/2008 | Bullock | |
| 2008/0095468 A1 | 4/2008 | Klemmer et al. | |
| 2009/0289951 A1 | 11/2009 | Matsuda | |
| 2009/0295712 A1 | 12/2009 | Ritzau | |
| 2010/0309390 A1* | 12/2010 | Plut | 348/744 |

* cited by examiner

*Primary Examiner* — William C Dowling
*Assistant Examiner* — Sultan Chowdhury
(74) *Attorney, Agent, or Firm* — Kunzler Law Group, PC

(57) ABSTRACT

An apparatus, method, and system for modifying application windows based on projection surface characteristics. One embodiment of the apparatus includes a determination module, an identification module, and a modification module. The determination module determines one or more characteristics of a projection surface including detrimental characteristics. The identification module identifies one or more application windows for displayed within the projected image. The one or more application windows correspond to one or more applications executing on a processor. One or more of the identified application windows are for projection on at least one location of one or more detrimental characteristics. The modification module modifies one or more of a size, a shape, and a position of at least a portion of the one or more identified application windows to avoid the at least one location of the one or more detrimental characteristics.

19 Claims, 7 Drawing Sheets

MODIFYING APPLICATION WINDOWS BASED ON PROJECTION SURFACE CHARACTERISTICS

BACKGROUND

1. Field

The subject matter disclosed herein relates to application windows and more particularly relates to modifying application windows based on projection surface characteristics.

2. Description of the Related Art

Projection computing involves projecting the display of a computing device onto a nearby surface. Certain portable electronic devices include integrated projectors, allowing the projected image to act as the monitor for the portable electronic device and display the applications that the user is executing on the computing device.

However, in certain instances, the projection surface may have undesirable characteristics that interfere with the displayed image, such as uneven lighting, interruptions in the surface, and texture. As a result, a user may have difficulty viewing the applications displayed in the projected image.

BRIEF SUMMARY

From the foregoing discussion, it should be apparent that a need exists for an apparatus, method, and system that modifies an application window of an application projected onto a projection surface. Beneficially, such an apparatus, method, and system would modify a size, shape, and/or position of an application window to accommodate detrimental characteristics of the projection surface.

The present subject matter has been developed in response to the present state of the art, and in particular, in response to the problems and needs in the art that have not yet been fully solved by currently available applications. Accordingly, the present subject matter has been developed to provide an apparatus, method, and system for modifying application windows based on projection surface characteristics that overcome many or all of the above-discussed shortcomings in the art.

One embodiment of an apparatus for modifying application windows based on projection surface characteristics is provided with a plurality of modules configured to functionally execute the steps of determining one or more characteristics of a projection surface, identifying one or more application windows for display, and modifying one or more of a size, a shape, and a position of at least a portion of the one or more identified application windows. These modules include a determination module, an identification module, and a modification module.

The determination module is configured to determine one or more characteristics of a projection surface. The projection surface is for displaying a projected image projected from a projector. The one or more characteristics include lighting characteristics and/or geometric characteristics. The characteristics include one or more detrimental characteristics that affect display of the projected image. The identification module is configured to identify one or more application windows for display within the projected image. The one or more application windows correspond to one or more applications executing on a processor. One or more of the identified application windows are for projection on at least one location of one or more detrimental characteristics. The modification module is configured to modify one or more of a size, a shape, and a position of at least a portion of the one or more identified application windows to avoid the at least one location of the one or more detrimental characteristics.

One embodiment of a method is also presented for modifying application windows based on projection surface characteristics. The method in the disclosed embodiments substantially includes the steps necessary to carry out the functions presented above with respect to the operation of the described apparatus. In one embodiment, the method includes determining one or more characteristics of a projection surface. The projection surface displays a projected image projected from a projector. The one or more characteristics include lighting characteristics and/or geometric characteristics. The characteristics include one or more detrimental characteristics that affect display of the projected image. The method includes identifying one or more application windows for display within the projected image. The one or more application windows correspond to one or more applications executing on a processor. One or more of the identified application windows are for projection on at least one location of one or more detrimental characteristics. The method also includes modifying one or more of a size, a shape, and a position of at least a portion of the one or more identified application windows to avoid the at least one location of the one or more detrimental characteristics.

One embodiment of a system is also presented for modifying application windows based on projection surface characteristics. The system may be embodied as a projector that projects an image onto a projection surface, one or more processors in communication with the projector, a determination module executing on at least one of the processors, an identification module executing on at least one of the processors, and a modification module executing on at least one of the processors.

The determination module is configured to determine one or more characteristics of the projection surface. The one or more characteristics include one or more of lighting characteristics and geometric characteristics. The characteristics include one or more detrimental characteristics that affect display of the projected image. The identification module is configured to identify one or more application windows for display within the projected image. The one or more application windows correspond to one or more applications executing on a processor. One or more of the identified application windows are for projection on at least one location of one or more detrimental characteristics. The modification module is configured to modify one or more of a size, a shape, and a position of at least a portion of the one or more identified application windows to avoid the at least one location of the one or more detrimental characteristics.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
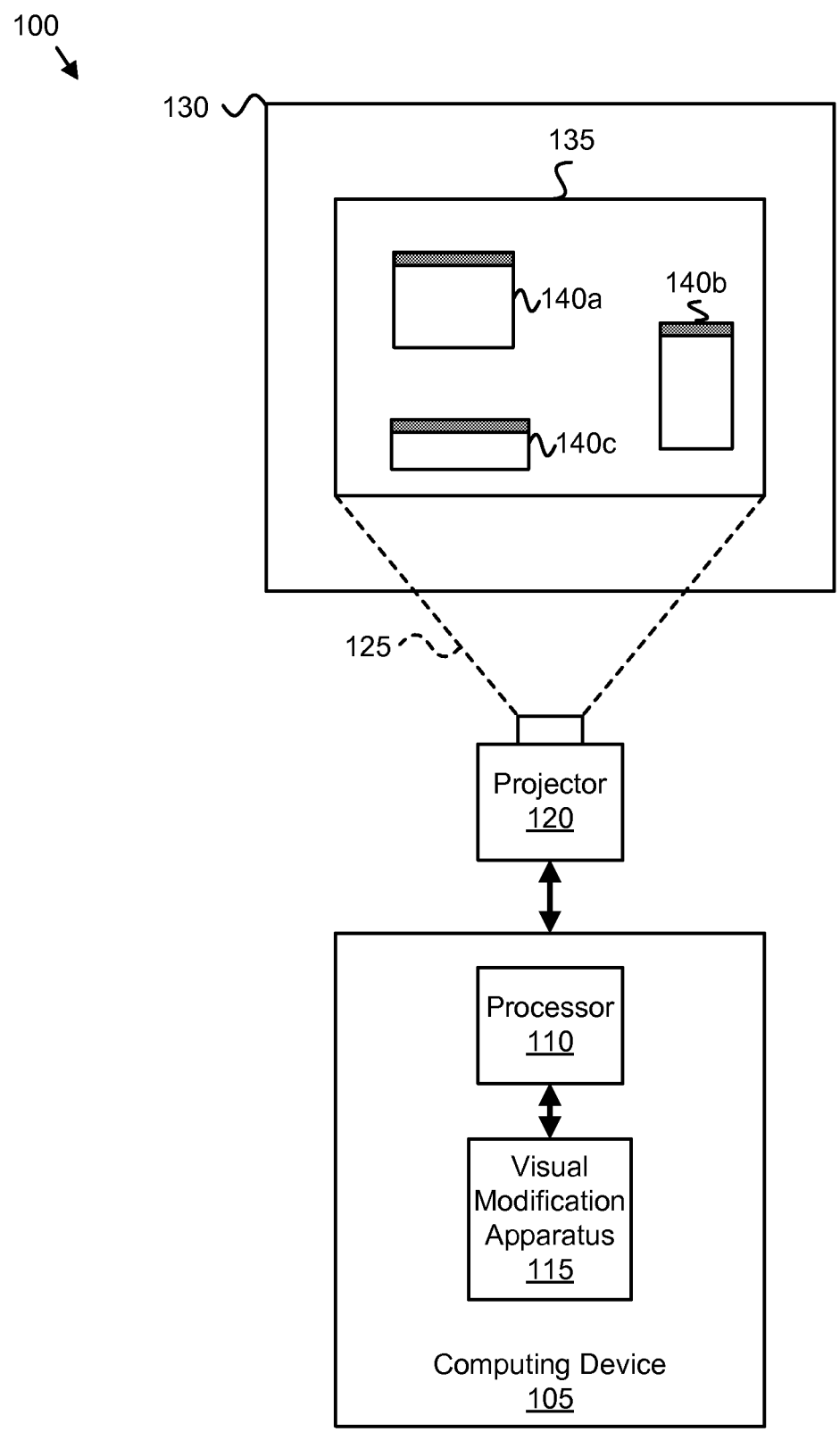
FIG. 1 is a schematic block diagram illustrating one embodiment of a system for modifying application windows based on projection surface characteristics.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 illustrates one embodiment of a system 100 for modifying application windows based on projection surface characteristics. The system 100 includes a computing device 105 with a processor 110 and a visual modification apparatus 115. The computing device 105 communicates with a projector 120 that projects 125 a projected image 135 onto a projection surface 130. The projected image 135 displays a plurality of application windows 140.

The computing device 105 may include a portable electronic device such as a touch device, a personal desktop assistant ("PDA"), a tablet computer, an eBook reader, a mobile phone, a Smartphone, and the like. The computing device 105 may also include a personal computer, a server, and the like.

The processor 110 may execute computer readable programs as is known to those skilled in the art. For example, the computing device 105 may include a memory storing the computer readable programs which the processor 110 may execute. The processor 110 may be in communication with the visual modification apparatus 115. Furthermore, although a single processor 110 is shown in the depicted embodiment, the computing device 105 may include a plurality of processors 110.

All or a portion of the visual modification apparatus 115 may be stored on the memory and executed by at least one processor 110. In addition, all or a portion of the visual modification apparatus 115 may be implemented as logic hardware. Furthermore, although in the depicted embodiment the visual modification apparatus 115 resides in the computing device 105, in other embodiments, all or a portion of the visual modification apparatus 115 may reside in the projector 120 and/or an external device in communication with the computing device 105. The visual modification apparatus 115 is described in greater detail below.

As stated above, the computing device 105 and/or processor 110 communicates with a projector 120 that projects 125 the projected image 135 onto the projection surface 130. In the depicted embodiment, the projector 120 is separately embodied from the computing device 105. In alternate embodiments, the projector 120 is integrated with the computing device 105. For example, the projector 120 and the computing device 105 may comprise a hand-held computing device 105 with an embedded projector 120. In one embodiment, the projector 120 includes one or more processors 110. In certain embodiments, one or more of the processors 110 of the projector execute all or a portion of the visual modification apparatus 115.

In the depicted embodiment, the projected image 135 displays a plurality of application windows 140 on the projection surface 130. The application windows 140 may correspond to applications executing on the processor 110.

The projection surface 130 may be any surface suitable to display a projected image 135. The quality of the projected image 135 may be influenced by characteristics of the projection surface 130. Ideally, the projection surface 130 is smooth, continuous, and even-lit. However, in reality, many projection surfaces 130 include characteristics that interfere with the projected image 135. For example, a projection surface 130 may have a rough texture that interferes with a display of a projected image 135. A projection surface 130 may have an interruption—the projection surface 130 may be broken into two or more sections. Also, an external object may interrupt the projection surface 130. For example, a chair rail may obscure a portion of the projection surface 130. In addition, the projection surface 130 may have varying lighting characteristics across portions of the projection surface 130. For example, a shadow may cover a portion of the projection surface 130. Furthermore, an upper portion of the projection surface 130 may have more light than a lower portion of the projection surface 130.

One or more of the characteristics described above may be detrimental characteristics, or characteristics that affect display of the projected image 135, forcing a user to manually resize and move an application window 140 or to endure imperfections in the application window 140. However, the visual modification apparatus 115 may modify visual attributes of the application windows 140 to accommodate projection surface characteristics. The visual modification apparatus 115 may, among other suitable actions, move, resize, reshape, and/or adjust the color/brightness of an application window 140 to minimize and/or avoid the detrimental characteristics of the projection surface 130. A user may thus view the application windows 140 with less interference from detrimental projection surface characteristics.

Figure 2:
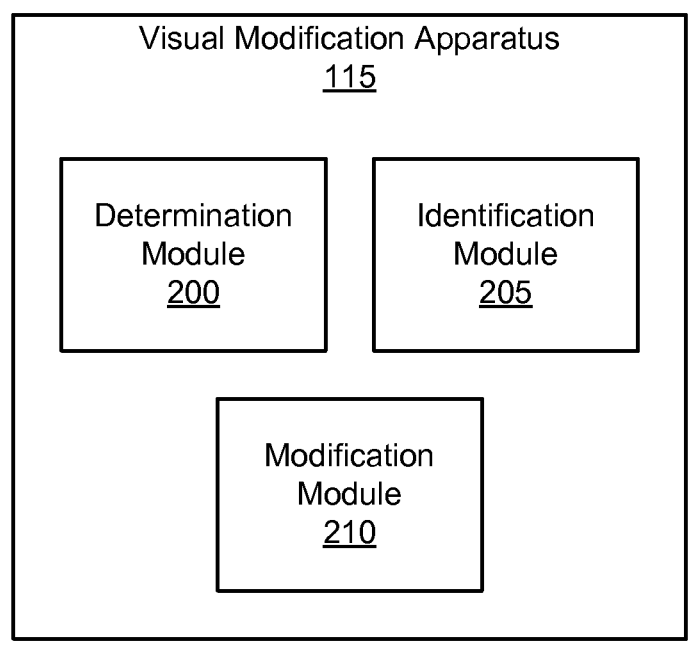
FIG. 2 is a schematic block diagram illustrating one embodiment of a window modification apparatus.

FIG. 2 illustrates one embodiment of the visual modification apparatus 115 depicted in FIG. 1. The description of the apparatus 115 refers to elements of FIG. 1, like numbers referring to like elements. The apparatus 115 includes a determination module 200, an identification module 205, and a modification module 210.

The determination module 200 determines one or more characteristics of a projection surface 130. The projection surface 130 may be for displaying a projected image 135 projected from a projector 120. The characteristics may include lighting characteristics and/or geometric characteristics. Lighting characteristics may include an amount of light/shading of the projection surface 130, an amount of light/shading on portions of the projection surface 130, and the like. Geometric characteristics may include texture of the projection surface 130, interruptions in the projection surface 130, objected obstructing the projection surface 130, one or more angles of the projection surface 130, and the like.

In one embodiment, the characteristics determined by the determination module 200 include detrimental characteristics that interfere with the projected image 135 and/or application windows 140 in the projected image 135. Detrimental characteristics may include, but are not limited to a portion of the projected image 135 having less clarity in relation to other portions of the projected image 135, a portion of the projection surface 130 having more light in relation to other portions of the projection surface 130, a portion of the projection surface 130 reflecting less light in relation to other portions of the projection surface 130, a portion of the projection surface 130 being less smooth in relation to other portions of the projection surface 130, and an interruption in the projection surface 130.

In one embodiment, the determination module 200 determines whether any detected characteristics are detrimental characteristics. The determination module 200 may classify a detected characteristic as a detrimental characteristic if the detected characteristic exceeds a predetermined threshold. The predetermined threshold may include an amount of light on a portion of the projection surface 130 in relation to other portions of the projection surface 130, dimensions of an interruption in the projection surface 130 (such as the width of a rail that runs across the projection surface), an amount of interference caused by uneven texture of the projection surface 130, and the like.

Figure 4A:
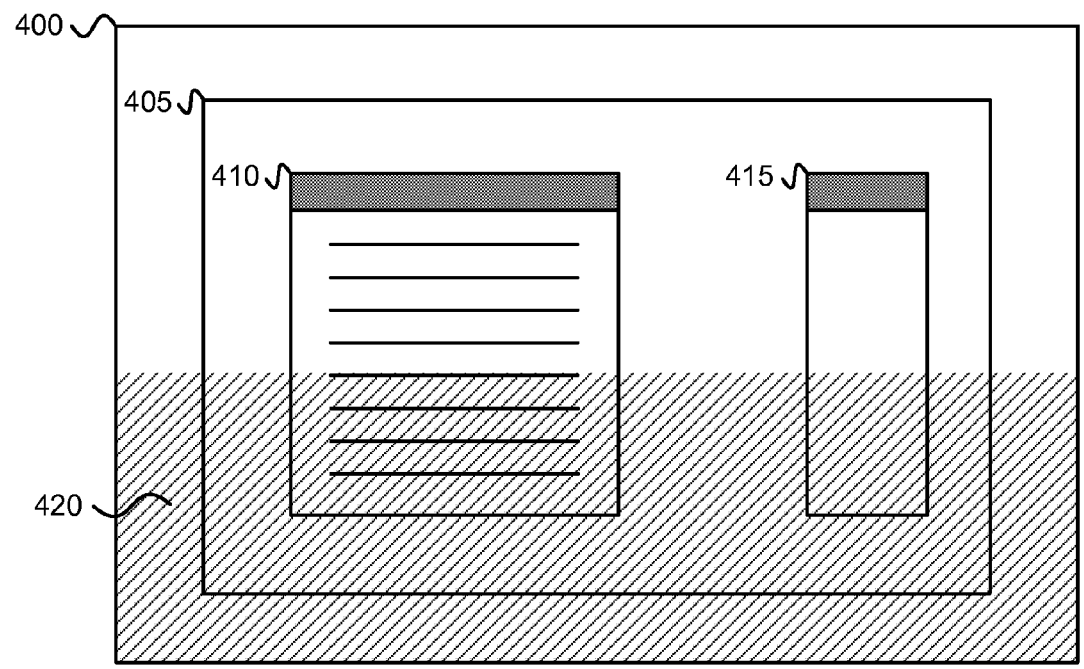
FIG. 4A is a schematic block diagram illustrating one embodiment of a projected image on a projection surface.

FIG. 4A shows an example of a projection surface 400 with a detrimental characteristic 420 across a lower portion of the projection surface 400. The depicted detrimental characteristic 420 may be a lighting characteristic interfering with a projected image 405 and with a first application window 410 and a second application window 415.

Figure 5A:
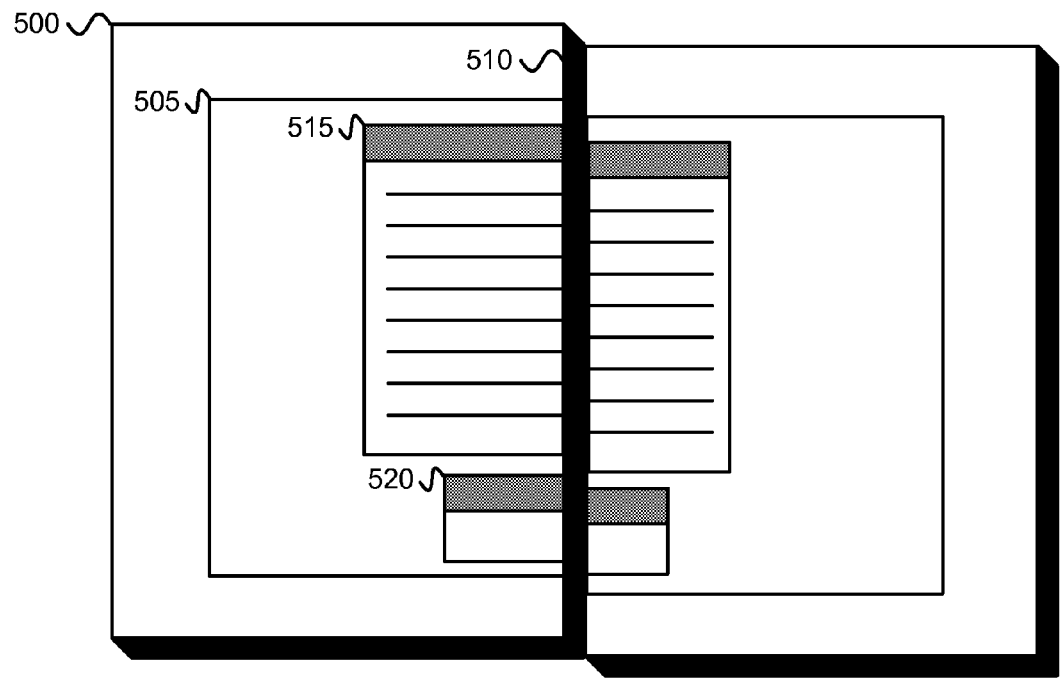
FIG. 5A is a schematic block diagram illustrating one embodiment of a projected image on a projection surface.

Referring to FIG. 5A, which shows another example of a projection surface 500, the detrimental characteristic may also be a geometric characteristic. Specifically, the projection surface 500 in FIG. 5A includes a detrimental characteristic 510 that interrupts the projection surface 500, interfering with the projected image 505 and a first application window 515 and a second application window 520.

Referring back to FIG. 2, the determination module 200 may determine characteristics of the projection surface 130 by scanning the projection surface 130. The determination module 200 may scan the projection surface 130 using one or more scanners.

The scanners may include an optical scanner that optically scans the projection surface 130 into a digital image. The scanners may include a digital camera that photographs the projection surface 130. For example, the projector 120 may project a calibration image onto the projection surface and photograph the projected image 135 with a digital camera.

The determination module 200 may analyze the resulting digital image to determine characteristics from distortions in the calibrated image.

The scanner may include an emitter that projects light onto the projected surface 130. The scanner may then detect reflection properties of the projected light with, for example, a spectrophotometer sensor, to determine projection surface texture and other characteristics. In other embodiments, the scanner may include photoelectric sensors, spectral sensors, ultrasonic sensors, and the like.

The one or more scanners may reside in the projector 120, computing device 105, and/or an external device. In one embodiment, the one or more scanners are located in a hand-held computing device 105 with an integrated projector 120. The scanners may communicate with the projector 120, processor 110, computing device 105, and/or visual modification apparatus 115 through a wired or wireless connection.

In one embodiment, the determination module 200 is initiated in response to a modification event. A modification event may include events and/or transitions on the computing device 105 that may indicate a need to determine/re-determine characteristics of the projection surface 130 and modify the application windows 140 accordingly. For example, a modification event may include, but is not limited to the computing device 105 receiving power, a power state transition of the computing device 105 such as the computing device 105 emerging from a hibernate state, and a change in an application window 140 such as a new application window 140 initializing or an application window 140 closing. In one embodiment, the determination module 200 periodically re-determines characteristics of the projection surface 130. For example, the determination module 200 may re-determine characteristics of the projection surface 130 and detect changes in the characteristics of the projection surface 130 from the previous projection surface determination.

The identification module 205 identifies one or more application windows 140 for display within the projected image 135. Additionally in one embodiment, the identification module 205 identifies application windows 140 that may be/are affected by detrimental characteristics by identifying application windows 140 for projection on at least one location of one or more detrimental characteristics determined by the determination module 200. An application window 140 may correspond to a software application executing on the processor 110. The application window 140 may include visual components of the software application for display by the projector 120 in the projected image 135. For example, in one embodiment, the application window 140 is a graphical user-interface window, panel, and/or display shown in an operating system user interface of an application running in the operating system.

An application of the application window 140 may execute on a processor 110 residing in the computing device 105, on a processor 110 residing in the projector 120, and the like. Each application window 140 may include one or more visual attributes such as color, shape, location, and the like. The visual attributes may also include an application window shape, an application window color, an application window size, an application window location (spatial coordinates of the application window on the projected image 135), and the like.

In one embodiment, the identification module 205 identifies one or more application windows 140 in response to the determination module 200 determining one or more characteristics of the projection surface 130. The identification module 205 may similarly re-identify application windows 140 in response to the determination module 200 re-determining the characteristics of the projection surface 130.

The modification module 210 modifies application windows 140. In one embodiment, the modification module 210 modifies one or more application windows 140 based on projection surface characteristics determined by the determination module 200. Specifically, the modification module 210 may modify a size, a shape, and/or a position of at least a portion of one or more identified application windows 140 to avoid at least one location of one or more detrimental characteristics. In certain embodiments, the modification module 210 is triggered in response to the identification module 205 identifying one or more application windows 140.

For example, the modification module 210 may modify an application window to avoid a location of detrimental characteristics of the projection surface 130 by modifying an application window shape, an application window color, an application window size, an application window location, and the like.

In one embodiment, the modification module 210 may modify visual attributes by increasing brightness in a portion of a particular application window. For example, the portion of a particular application window may be located on a portion of the projected surface 130 with more light and increased brightness in the portion of the application window may aid in visibility. In some embodiments, the modification module 210 may modify visual attributes by adjusting a shape of a portion of an application window. In one embodiment, the modification module 210 modifies one or more of the size, the shape, and the position of a first portion of an identified application window 140 to avoid a location of a detrimental characteristic and does not modify a second portion of the identified application window 140. In this embodiment, the second portion of the identified application window 140 may substantially remain with an initial layout (size, shape, position, and the like). Specifically, if a first portion of an application window 140 is projected on a location of a detrimental characteristic but a second portion of the application window 140 is not, the modification module 210 may move the first portion of the identified application window 140 next to the second portion of the identified application window 140, resize the first portion of the identified application window 140, and/or change shape of the first portion of the identified application window 140 to avoid the detrimental characteristic.

Figure 4B:
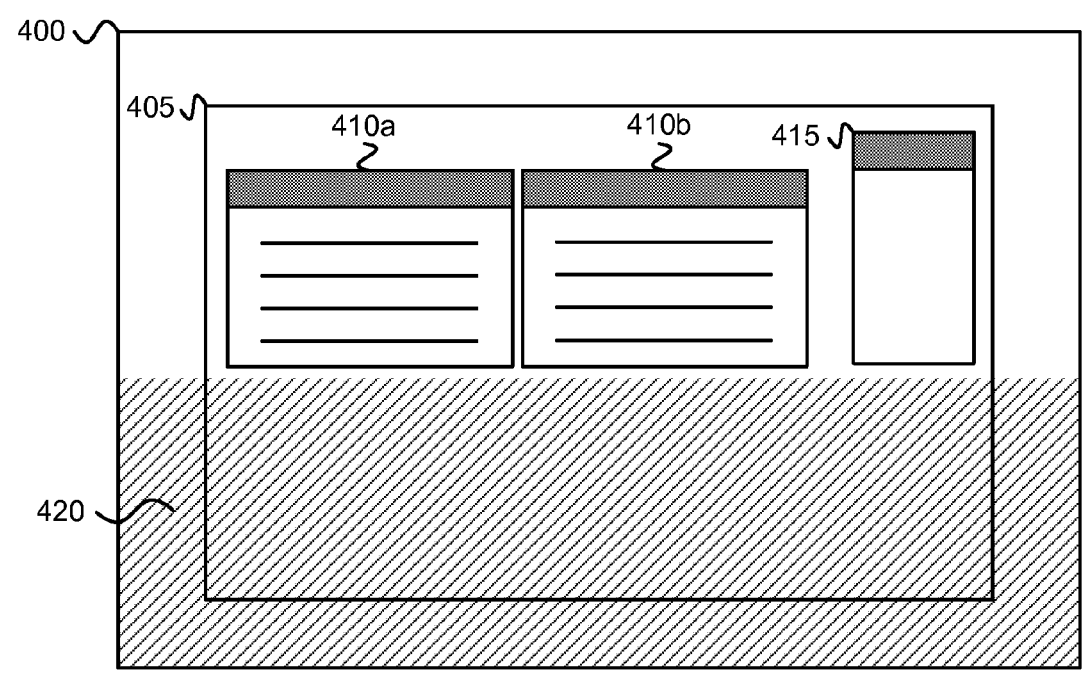
FIG. 4B is a schematic block diagram illustrating another embodiment of a projected image on the projection surface of FIG. 4A.

For example, referring also to FIG. 4B, the modification module 210 may split the first application window 410 into two portions 410a, b and position them side-by-side to avoid the detrimental characteristic 420. In addition, the modification module 210 may reposition and resize the second application window 415 to also avoid the detrimental characteristic 420.

Figure 5B:
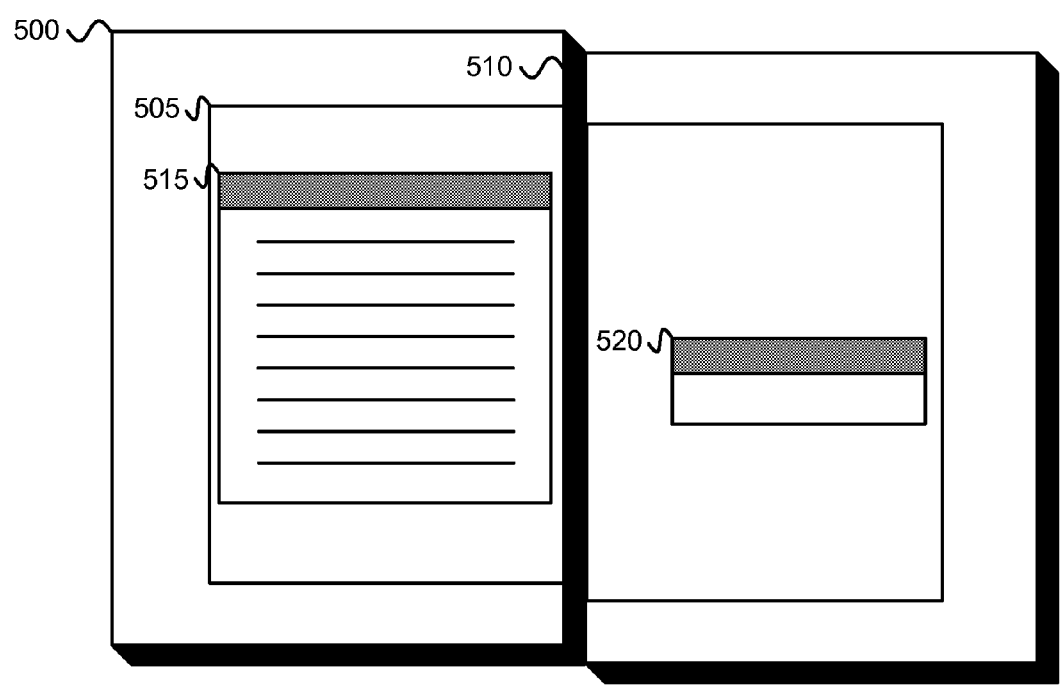
FIG. 5B is a schematic block diagram illustrating another embodiment of a projected image on the projection surface of FIG. 5A.

Referring to FIG. 5B, the modification module 210 may reposition the first application window 515 to avoid the detrimental characteristic 510. In addition, the modification module 210 may reposition the second application window 415 to also avoid the detrimental characteristic 510.

Referring back to FIG. 2, the modification module 210 may interface directly with an application 140 to modify its corresponding application window 140. For example, the modification module 210 may interface with a user interface display component of a particular application to adjust the application window size of its application window 140 or to adjust the location of the application window. The modification module 210, in one embodiment, interfaces with an operating system operating on the computing device 105 or projector 120 that is hosting an application to modify an application window 140 of the application. For example, the modification module 210 may interface with the operating system to adjust the application window size of the application window 140 or to adjust the location of the application window of the application.

The modification module 210 may modify identified application windows 140 prior to the projector 120 projecting 125 the projected image 135 that displays the one or more identified application windows 140. The modification module 210 may also modify identified application windows 140 in a currently projected image 135. In one embodiment, the modification module 210 modifies application windows 140 and the modified application windows 140 are utilized by the computing device 105 and/or processor 110 in preparing and outputting image data for projection as the projected image 135. In certain embodiments, the modification module 210 modifies an application window 140/a portion of an application window 140 in a received image (an image and/or image data that has already been prepared by the computing device 105 and/or processor 110 for projection). For example, the modification module 210 may receive image data for an image, move and resize a portion of an application window 140 by modifying the image data, and then output the modified image data of the received image for projection as a projected image 135. The modified received image may then be subsequently projected by the projector 120 onto the projection surface 130.

In one embodiment, the modification module 210 periodically re-modifies one or more application windows 140. The modification module 210 may re-modify the size, shape, and/or position of an application window 140 in response to a re-modification signal from a user, an identified application window 140 closing, an additional application window 140 opening and/or a change in characteristics of the projection surface 130 from the determination module 200 re-determining the one or more characteristics. For example, a user may close an application window 140 that was displayed in a desirable portion of the projected image 135 and the modification module 210 may re-modify the remaining application windows 140 to occupy the now vacant desirable portion of the projected image 135. In another example, a user may select an application window 140 that is displayed in a location affected by detrimental characteristics. The modification module 210 may re-modify the size, shape, and/or position of the newly selected application window 140 to avoid the location with the detrimental characteristics.

In one embodiment, the modification module 210 determines whether detrimental characteristics identified by the identification module 205 interfere with any application windows 140. For example, the modification module 210 may reference the position of any detrimental characteristics determined by the determination module 200. The modification module 210 may then compare the position with the dimensions of the identified application windows 140. If the position of a particular detrimental characteristic falls within the dimensions of a particular application window 140, the modification module 210 may determine that the particular detrimental characteristic interferes with the particular application window 140.

In one embodiment, the modification module 210 modifies application windows 140 based on one or more modification parameters. The modification parameters may include default parameters and user-defined parameters that specify potential modification actions. For example, a user may specify that the width of a word processing application window should not modified to be narrower than a certain value. If the user has not defined a particular parameter, the modification module 210 may refer to default parameters for modification instructions.

In one embodiment, the modification module 210 modifies application windows 140 based on a priority of the application window 140 and/or corresponding application. The priority of an application window 140/application may be determined by default modification parameters, user-defined modification parameters, a modification history, an application usage-frequency of an application corresponding to a particular identified application window 140, and the like. The modification module 210 may modify an application window 140 with a higher priority to be more visible in relation to an application window 140 with a lower priority. For example, a user may designate an email application as having a higher priority than a word processing application. The modification module 210 may modify the email application window first, allowing the email application window a location in the projected image 135 with the least detrimental characteristics. In one embodiment, the modification module 210 modifies application windows 140 that meet a priority threshold and does not modify application windows 140 of lower priority.

In one embodiment, the modification module 210 modifies an application window 140 that is currently selected and does not modify one or more unselected application windows 140. For example, the modification module 210 may modify an application window 140 that is selected, identified, and/or in "focus" in the operating system user interface (such as when a user is interacting with the application window). The modification module 210 may move the focused application window to a favorable location in the projected image 135 and not modify other application windows 140 (such as those that are "minimized"). In a further embodiment, when the user selects an additional application window 140, the modification module 210 may then modify the additional application window 140 by moving it into the favorable location in the projected image 135 in place of or in addition to the first application window. One of skill in the art will recognize other ways for the modification module 210 to modify one or more applications or other features in a projected image.

Figure 3:
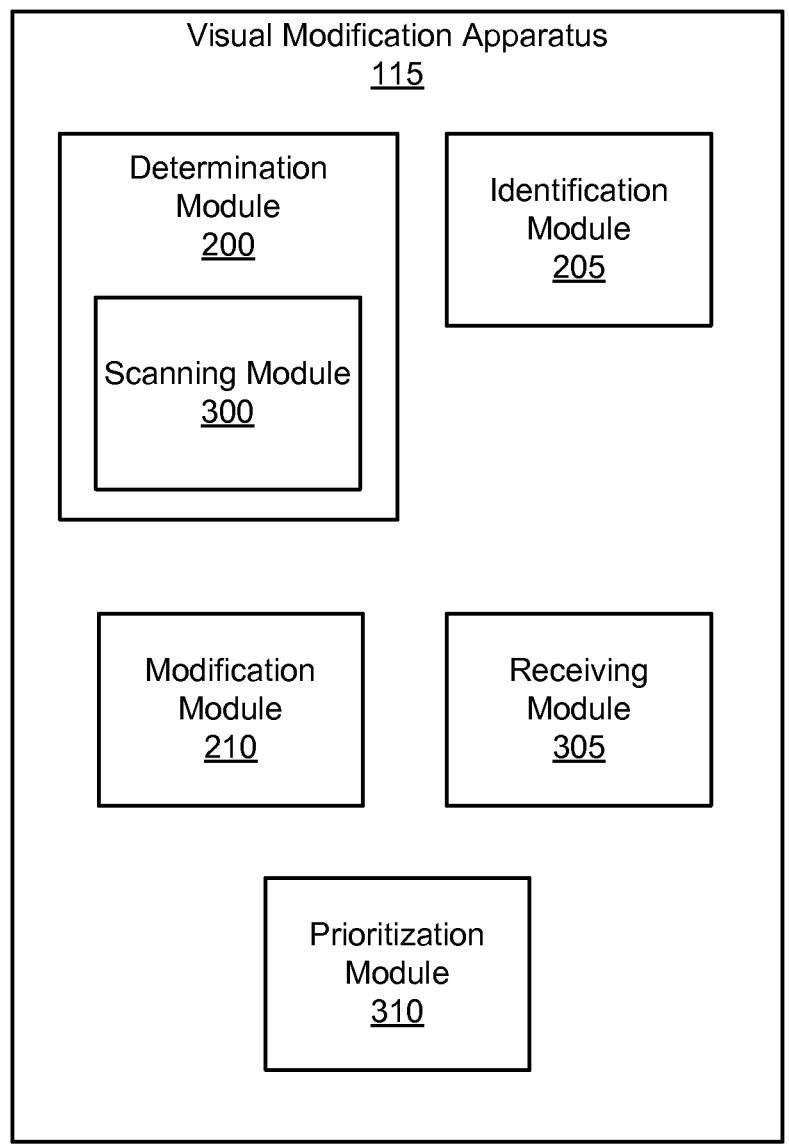
FIG. 3 is a detailed schematic block diagram illustrating another embodiment of a window modification apparatus.

FIG. 3 illustrates another embodiment of the visual modification apparatus 115 depicted in FIG. 1. The description of the apparatus 115 refers to elements of FIGS. 1 and 2, like numbers referring to like elements. The apparatus 115 includes the determination module 200, the identification module 205, and the modification module 210, which are similar to the determination module 200, the identification module 205, and the modification module 210 described in relation to FIG. 2. In addition, the determination module 200 further includes a scanning module 300 and the apparatus further includes a receiving module 305 and a prioritization module 310.

The scanning module 300 scans the projection surface 130 with one or more scanners to determine the one or more characteristics. As described above, the scanners may include an optical scanner, a digital camera, a spectrophotometer sensor, a photoelectric sensor, a spectral sensor, an ultrasonic sensor, and the like. The projector 120 may project a calibration image onto the projection surface 130 and photograph the projected image 135 with a digital camera. The determination module 200 and/or scanning module 300 may analyze the resulting digital image to determine characteristics from distortions in the calibrated image. One skilled in the art realized that other suitable scanners may be used to determine characteristics of the projection surface 130. The receiving module 305 receives an image displaying one or more application windows 140. Receiving an image may include receiving an image and/or image data that has already been prepared by the computing device 105 and/or processor 110 for projection. The receiving module 305 may communicate the received image to the modification module 210 to modify application windows 140 in the received image as described above. For example, the modification module 210 may modify the image data of the received image to increase brightness in a portion of a application window 140, and then output the modified image data for projection as a projected image 135. The modified received image may then be subsequently projected by the projector 120 onto the projection surface 130.

The prioritization module 310 prioritizes one or more application windows 140/applications with application windows 140. The prioritization module 310 may prioritize a particular application window 140 based on one or more modification parameters as described above. The prioritization module 310 may also prioritize an application window 140 based on the frequency that a user uses the application corresponding to the application window 140 and/or interacts with the application window 140. In addition, the prioritization module 310 may prioritize an application window 140 using any suitable method.

Figure 6:
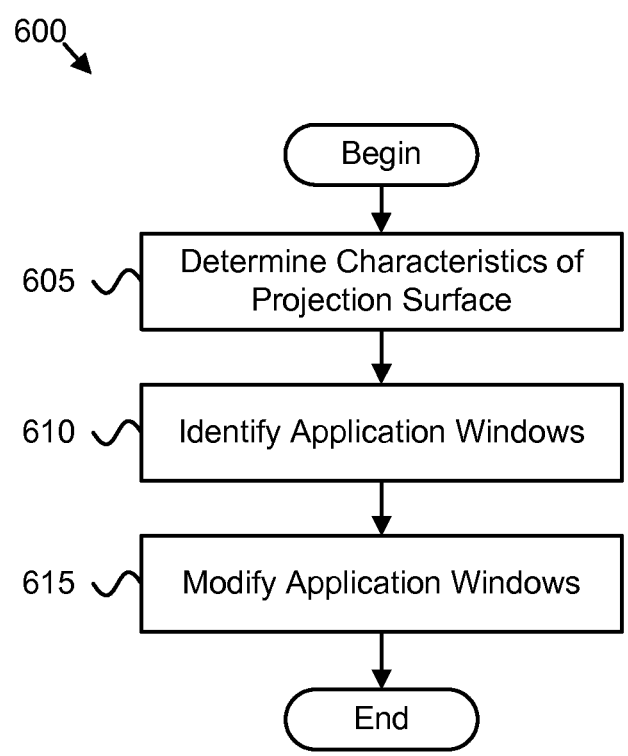
FIG. 6 is a schematic flow chart diagram illustrating one embodiment of a method for modifying application windows based on projection surface characteristics.

FIG. 6 illustrates one embodiment of a method 600 for modifying application visual attributes based on projection surface 130 characteristics. The method 600 substantially includes the steps to carry out the functions presented above with respect to the operation of the described apparatus and systems of FIGS. 1 and 2. The description of the method 600 refers to elements of FIGS. 1 and 2, like numbers referring to like elements.

The method 600 starts and the determination module 200 determines 605 one or more characteristics of a projection surface 130. The projection surface 130 may display a projected image 135 from a projector 120. The characteristics may include lighting characteristics and/or geometric characteristics. The characteristics may include detrimental characteristics that affect display of the projected image 135. Next, the identification module 205 identifies 610 one or more application windows 140 for display within the projected image 135. The identified application windows 140 may correspond to applications executing on a processor 110 and may be for projection on at least one location of one or more detrimental characteristics. The processor 110 may reside in a computing device 105, a projector 120, an electronic device with both a computing device 105 and a projector 120, and the like. The modification module 210 then modifies 615 a size, shape, and/or position of at least a portion of the identified application windows 140 to avoid the at least one location of the one or more detrimental characteristics. Then, the method 600 ends.

Figure 7:
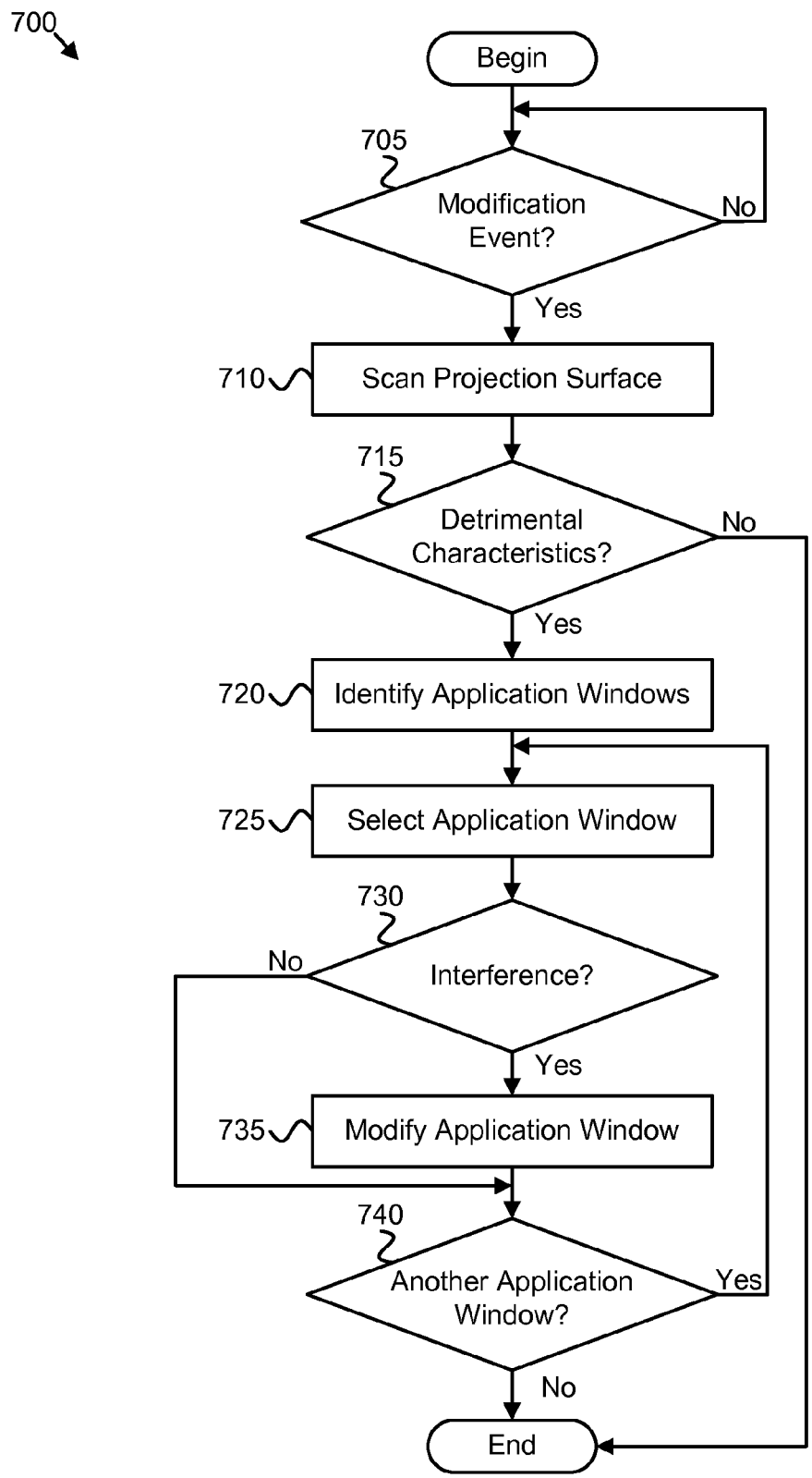
FIG. 7 is a detailed schematic flow chart diagram illustrating another embodiment of a method for modifying windows based on projection surface characteristics.

FIG. 7 illustrates another embodiment of a method 700 for modifying application visual attributes based on projection surface 130 characteristics. The method 700 starts and the determination module 200 determines 705 whether there is a modification event. A modification event may include such events as a computing device 105 initializing, a power state transition of a computing device 105, a projector 120 projecting on an initial projection surface 130 or on a new projection surface 130, and the like. If the determination module 200 determines 705 that a modification event occurs, the scanning module scans 710 a projection surface 130 that displays/for display of a projected image 135 projected from a projector 120 to determine characteristics of the projection surface 130. The characteristics may include lighting characteristics and/or geometric characteristics.

The determination module 200 then determines 715 whether any detected characteristics are detrimental characteristics. If the determination module 200 determines 715 that the detected characteristics are not detrimental characteristics, the method 700 ends. If the determination module 200 determines 715 that the detected characteristics are detrimental characteristics, the identification module 205 identifies 720 one or more application windows 140 corresponding to executing applications. Each application window 140 is for display in the projected image 135 and may include one or more visual attributes. Each displayed application 140 may include an application window.

The identification module 205 then selects 725 an application window 140. The identification module 205 may select 725 an application window 140 according to priority, as prioritized by the prioritization module 310. The identification module 210 then determines 730 whether any detrimental characteristics interfere with the application window 140 (the application window 140 is for projection on at least one location of a detrimental characteristic). If the identification module 205 determines 730 that one or more of the detrimental characteristics interfere with the application window 140, the modification module 210 modifies 735 the size, shape, and/or position of at least a portion of the application windows to avoid the location of the one or more detrimental characteristics.

Alternatively, if the identification module 205 determines 730 that one or more of the detrimental characteristics do not interfere with the application window 140, the identification module 205 determines 740 whether there is another application window 140 to select. If the identification module 210 detects 740 an additional application window 140, the identification module 205 selects the additional application window 140 and the method 700 continues with subsequent steps 730-740 as described above. Alternatively, if the identification module 205 detects 740 no other application windows 104, the method 700 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for modifying application visual attributes based on projection surface characteristics, the apparatus comprising:

a determination module for determining one or more characteristics of a projection surface, the projection surface for displaying a projected image projected from a projector, the one or more characteristics comprising one or more of lighting characteristics and geometric characteristics, the characteristics comprising one or more detrimental characteristics that affect display of the projected image, wherein the determination module scans the projection surface to determine the detrimental characteristics;

an identification module for identifying one or more application windows for display within the projected image, the one or more application windows corresponding to one or more applications executing on a processor, wherein one or more of the identified application windows are for projection on at least one location of one or more detrimental characteristics; and a modification module for modifying one or more of a size, a shape, and a position of at least a portion of the one or more identified application windows to avoid the at least one location of the one or more detrimental characteristics.

2. The apparatus of claim 1, wherein the modification module modifies one or more of the size, the shape, and the position of a first portion of an identified application window to avoid the at least one location of the one or more detrimental characteristics and does not modify a second portion of the identified application window.

3. The apparatus of claim 2, wherein the modification module one or more of:
  moves the first portion of the identified application window next to the second portion of the identified application window;
  resizes the first portion of the identified application window; and
  changes a shape of the first portion of the identified application window,
to avoid the at least one detrimental characteristic.

4. The apparatus of claim 1, wherein the one or more detrimental characteristics comprise one or more of a portion of the projected image having less clarity in relation to other portions of the projected image, a portion of the projection surface having more light in relation to other portions of the projection surface, a portion of the projection surface reflecting less light in relation to other portions of the projection surface, a portion of the projection surface being less smooth in relation to other portions of the projection surface, and an interruption in the projection surface.

5. The apparatus of claim 1, wherein the determination module periodically re-determines the one or more characteristics of the projection surface, the identification module re-identifying one or more application windows and the modification module re-modifying one or more of the size, the shape, and the position of at least a portion of the one or more identified application windows in response to a change in the one or more characteristics of the projection surface from the determination module re-determining the one or more characteristics.

6. The apparatus of claim 1, wherein the modification module re-modifies one or more of the size, the shape, and the position of at least a portion of the one or more identified application windows in response to one or more of a re-modification signal from a user, an identified application window closing, and an additional application window opening.

7. The apparatus of claim 1, wherein the modification module modifies one or more of the size, the shape, and the position of at least a portion of the one or more identified application windows prior to the projector projecting the projected image that displays the one or more identified application windows.

8. The apparatus of claim 1, wherein the modification module modifies one or more of the size, the shape, and the position of at least the portion of the one or more identified application windows in a currently projected image displaying the one or more identified application windows.

9. The apparatus of claim 1, further comprising a receiving module for receiving an image, the image displaying the one or more application windows, wherein the modification module modifying one or more of the size, the shape, and the position of at least a portion of the one or more identified application windows further comprises the modification module modifying one or more of the size, the shape, and the position of at least a portion of the one or more identified application windows in the received image to create a modified received image, wherein the modified received image is projected by the projector onto the projection surface.

10. The apparatus of claim 1, further comprising a prioritization module for prioritizing the one or more identified application windows wherein the modification module modifies one or more of the size, the shape, and the position of an identified application window with a higher priority to be more visible in relation to an identified application window with a lower priority.

11. The apparatus of claim 10, wherein the prioritization module prioritizes the one or more identified application windows based on one or more of default modification parameters, user-defined modification parameters, a modification history, and an application usage-frequency of an application corresponding to a particular identified application window.

12. The apparatus of claim 1, wherein the modification module modifies one or more of the size, the shape, and the position of at least a portion of a selected application window and does not modify one or more unselected application windows, the selected application window comprising an identified application window.

13. A method for modifying application visual attributes based on projection surface characteristics, the method comprising:
  determining one or more characteristics of a projection surface by scanning the projection surface, the projection surface for displaying a projected image projected from a projector, the one or more characteristics comprising one or more of lighting characteristics and geometric characteristics, the characteristics comprising one or more detrimental characteristics that affect display of the projected image;
  identifying one or more application windows for display within the projected image, the one or more application windows corresponding to one or more applications executing on a processor, wherein one or more of the identified application windows are for projection on at least one location of one or more detrimental characteristics; and
  modifying one or more of a size, a shape, and a position of at least a portion of the one or more identified application windows to avoid the at least one location of the one or more detrimental characteristics.

14. The computer program product of claim 13, wherein modifying one or more of the size, the shape, and the position of at least a portion of the one or more identified application windows further comprises modifying one or more of the size, the shape, and the position of a first portion of a particular application window to avoid the at least one location of the one or more detrimental characteristics and not modifying a second portion of the particular application window, wherein the second portion substantially remains with an initial layout.

15. The computer program product of claim 13, further comprising prioritizing the one or more identified application windows wherein modifying one or more of a size and a position of at least a portion of the one or more identified application windows further comprises modifying an identified application window with a higher priority to be more visible in relation to an identified application window with a lower priority, wherein prioritizing the one or more identified application windows further comprising prioritizing the one or more identified application windows based on one or more of default modification parameters, user-defined modification parameters, a modification history, and an application usage-frequency of an application corresponding to a particular identified application window.

16. A system for modifying application visual attributes based on projection surface characteristics, the system comprising:

a projector that projects an image onto a projection surface;

one or more processors in communication with the projector;

a determination module executing on at least one of the processors, the determination module for determining one or more characteristics of the projection surface, the one or more characteristics comprising one or more of lighting characteristics and geometric characteristics, the characteristics comprising one or more detrimental characteristics that affect display of the projected image, wherein the determination module scans the projection surface to determine the detrimental characteristics;

an identification module executing on at least one of the processors, the identification module for identifying one or more application windows for display within the projected image, the one or more application windows corresponding to one or more applications executing on a processor, wherein one or more of the identified application windows are for projection on at least one location of one or more detrimental characteristics; and a modification module executing on at least one of the processors, the modification module for modifying one or more of a size, a shape, and a position of at least a portion of the one or more identified application windows to avoid the at least one location of the one or more detrimental characteristics.

17. The system of claim 16, wherein at least one of the one or more processors resides in the computing device.

18. The system of claim 16, wherein at least one of the one or more processors resides in the projector.

19. The system of claim 16, wherein the determination module uses a scanner in communication with the one or more processors for scanning the projection surface to determine the one or more characteristics.

* * * * *